United States Patent [19]
Yamaguchi et al.

[11] Patent Number: 5,728,484
[45] Date of Patent: Mar. 17, 1998

[54] SEALING GASKET FOR A BATTERY AND A METHOD FOR PRODUCING SUCH A GASKET

[75] Inventors: Masayoshi Yamaguchi, Sumoto; Yukio Fujimoto; Hiroshi Oosaka, both of Tsuna-gun, all of Japan

[73] Assignee: Sanyo Electric Co., Ltd., Moriguchi, Japan

[21] Appl. No.: 688,052

[22] Filed: Jul. 31, 1996

[30] Foreign Application Priority Data

Aug. 4, 1995 [JP] Japan .................. 7-199975

[51] Int. Cl.$^6$ .................................. H01M 2/08
[52] U.S. Cl. .................. 429/35; 277/12; 264/328.9
[58] Field of Search ................ 277/9.5, 10, 12; 264/328.9, DIG. 47; 429/35

[56] References Cited

U.S. PATENT DOCUMENTS

| | | | |
|---|---|---|---|
| 2,949,635 | 8/1960 | Chiero | 425/DIG. 47 |
| 3,550,987 | 12/1970 | Dickey | 277/10 |
| 4,054,630 | 10/1977 | Wang | 264/97 |
| 4,990,739 | 2/1991 | Zaplatynsky | 219/121.47 |
| 5,370,270 | 12/1994 | Adams et al. | 222/88 |
| 5,470,219 | 11/1995 | Yokoyama et al. | 264/328.9 |

FOREIGN PATENT DOCUMENTS

| | | |
|---|---|---|
| 61-27061 | 2/1986 | Japan |
| 62-30284 | 8/1987 | Japan |
| 61-118961 | 6/1989 | Japan |

OTHER PUBLICATIONS

*Injection Molding Handbook*, "Gates", p. 184.

*Primary Examiner*—Scott Cummings
*Attorney, Agent, or Firm*—Armstrong, Westerman, Hattori, McLeland & Naughton

[57] ABSTRACT

It is an object of the present invention to improve reliability of a battery cell by preventing residual stress in the ting of a sealing gasket so as to provide a sealing gasket which does not crack. The object is achieved by a sealing gasket for a battery cell produced by injecting molten resin into a cavity from a gate which corresponds to a tip of a resin injection nozzle of a metal mold, wherein a ring forming a body of the gasket has an inward protrusion projecting inwardly from an internal surface of the ring and the gate is operatively disposed at a part which corresponds to the inward protrusion. In the sealing gasket so-produced, residual stress is generated in the inward protrusion. Therefore, the strength of the ring does not deteriorate because of the effects of the residual stress and cracking of the gasket can be prevented.

8 Claims, 10 Drawing Sheets

SEALING GASKET FOR A BATTERY AND A METHOD FOR PRODUCING SUCH A GASKET

BACKGROUND OF THE INVENTION

1. Field of the Invention

The present invention relates to a sealing gasket made of resin, which is placed between a casing and a cover plate at an opening of a battery cell and a method for producing such a gasket.

2. Related Art

Generally, production of a battery cell can be explained as follows. An electrode assembly consisting of a positive electrode and a negative electrode insulated by a separator is placed in a metal casing. A metal cover plate is fixed to the opening of the metal casing by means of a ring shaped sealing gasket made of resin so that the opening of the metal casing can be sealed hermetically.

Figure 1:
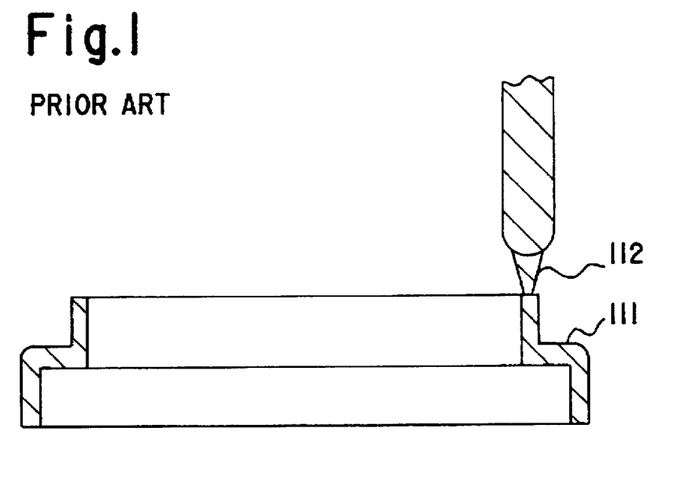
FIG. 1 is a cross-sectional view showing a conventional method for producing a gasket.

The sealing gasket is normally produced by injection molding. FIG. 1 shows an example. In this figure, the hatched part represents resin and the part which is not hatched represents a metal mold. This metal mold comprises cavity 111 and gate 112. Molten resin is injected into cavity 111 from gate 112. Cavity 111 has the same configuration as the gasket. After the molten resin solidifies, it is cut or ripped apart at date 112. Then, a gasket can be obtained.

Generally, when this injection molding is used, gate 112 corresponds to a part of the top surface of a ring gasket (Japanese Laid-Open Patent Applications Nos. 61-27061, and 61-118961). This can be recognized in FIG. 1 by gate 112 being provided at a part of the top surface of cavity 111.

Figure 2:
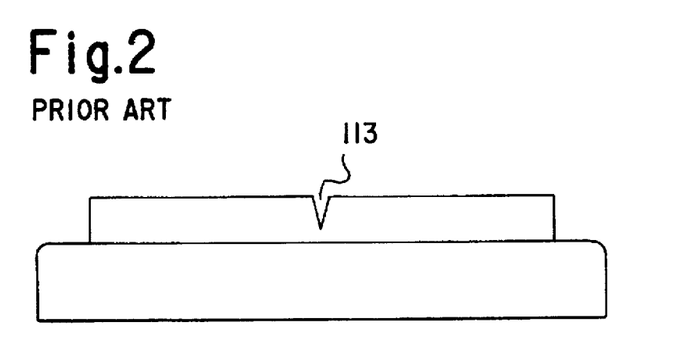
FIG. 2 is a front view of a gasket having a crack produced by the method of FIG. 1.

This injection molding has a problem. In winter, when the moisture absorption rate of resin decreases, a crack 113 occurs at the top surface of the gasket, where the solidified resin has been cut (gate cut area). An example is shown in FIG. 2. Such cracking deteriorates hermeticity of the cell, resulting in leakage of electrolyte.

Figure 3:
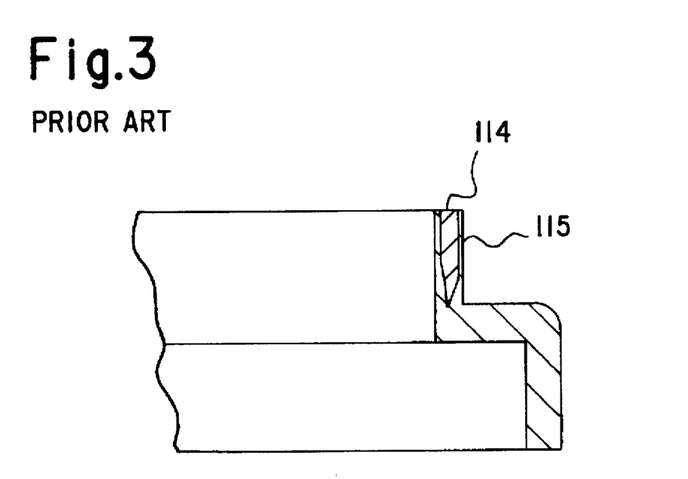
FIG. 3 is a cross-sectional view of a part of the gasket according to the method of FIG. 1.

FIG. 3 is a polarization picture of a cross-sectional view of the gasket having such a gate cut area. As is apparent from this figure, a residual stress part 115 is generated at the gate cut area 114 and the gate cut area 114 has microcracked, which deteriorates strength.

Figure 4:
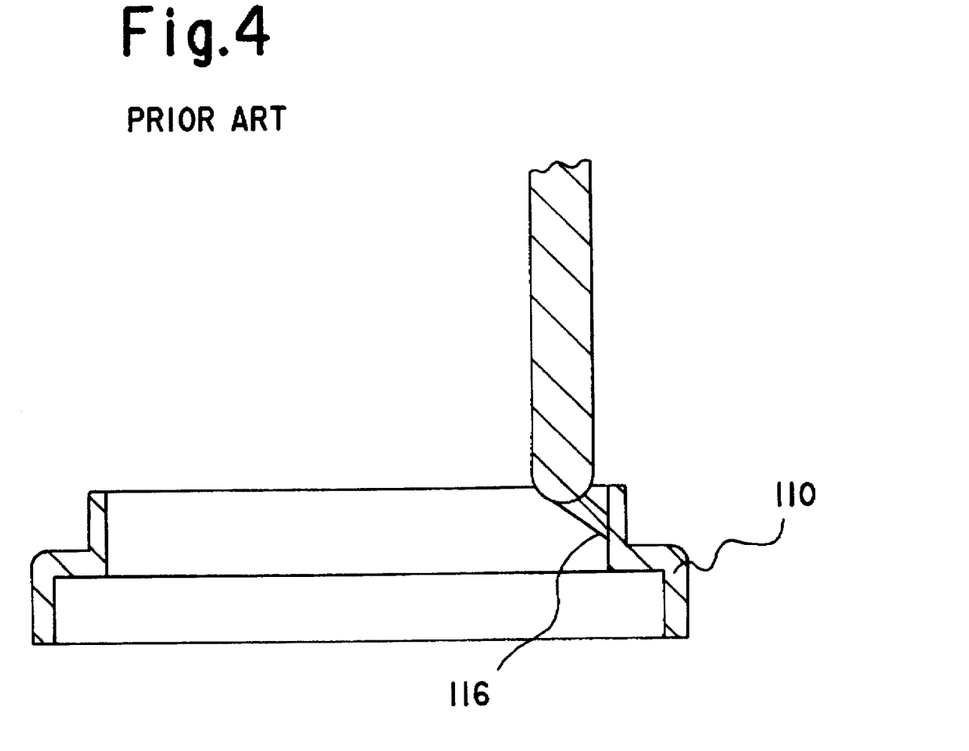
FIG. 4 is a cross-sectional view showing a conventional method for producing a gasket, in which a gate is provided on the internal surface of the cavity.

In order to avoid such cracking of a gasket, it is possible to provide a gate 116 at a part of internal surface of the cavity 117, as is shown in FIG. 4.

Figure 5:
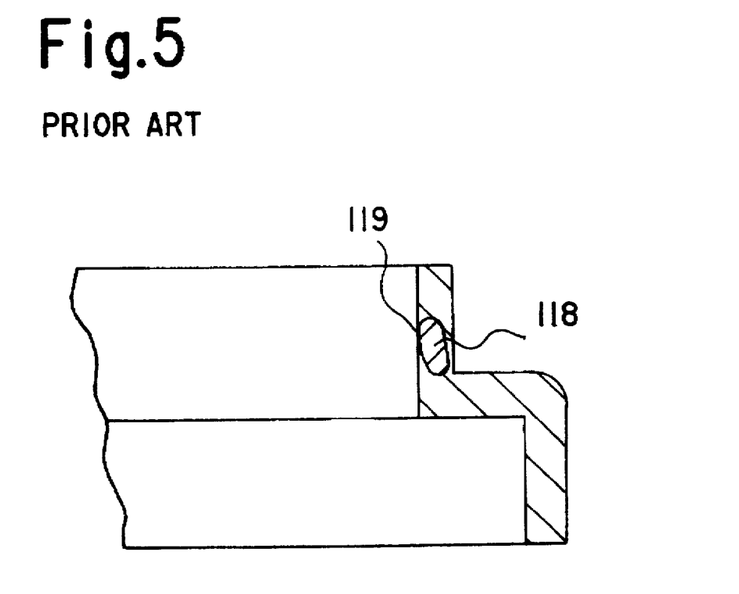
FIG. 5 is a cross-sectional view of a part of the gasket according to the method of FIG. 4.

However, even in this case, a residual stress part 118 is generated at a part corresponding to the gate cut area 119, which results in poor quality of the gasket. An example is shown in FIG. 5.

Figure 6:
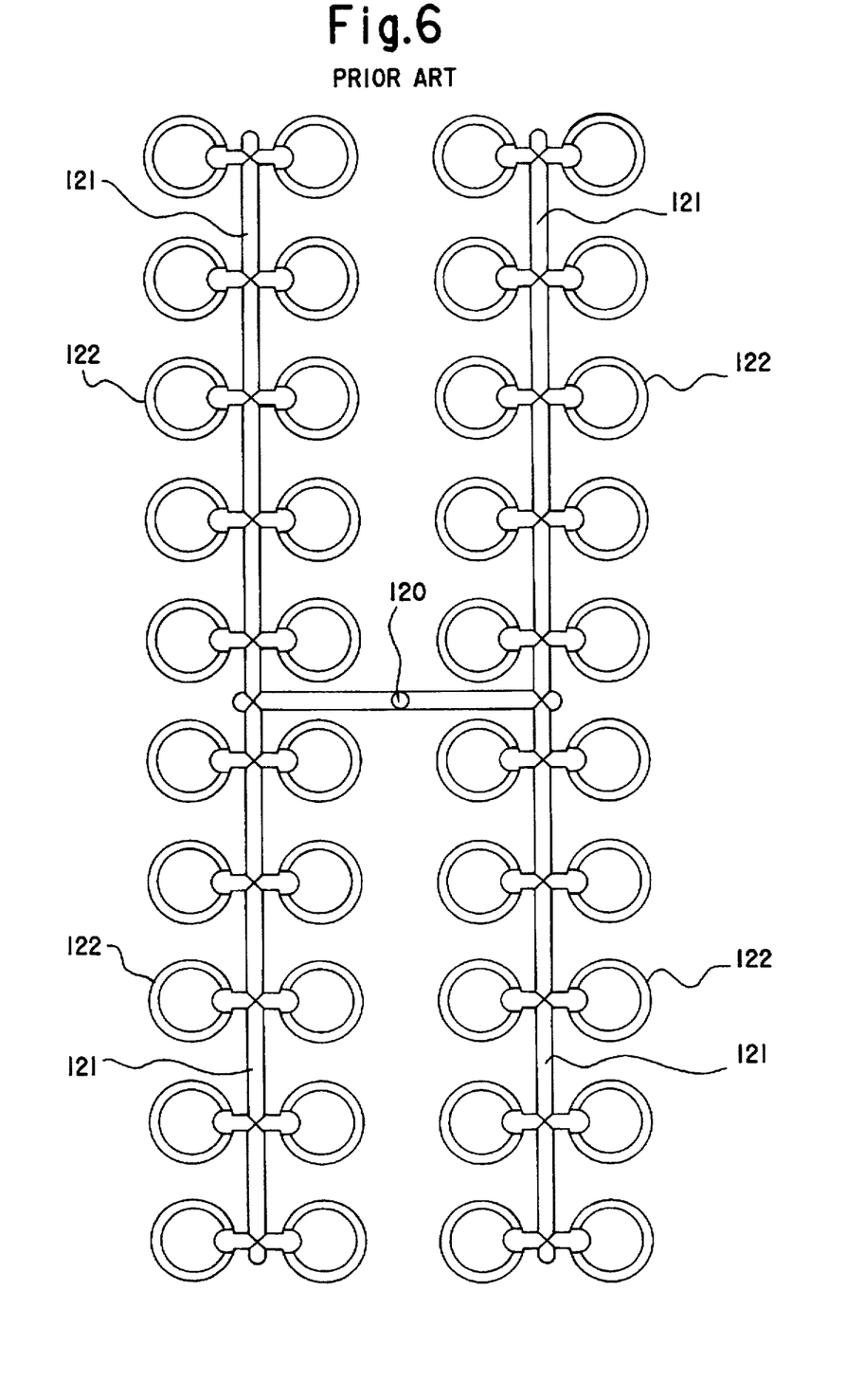
FIG. 6 is a plan view showing a conventional method for producing a gasket according to the cold runner method.

There are two methods to produce a sealing gasket by means of injection molding. One of them is the cold runner method, which has been often used. An example is shown in FIG. 6, in which forty gaskets can be produced at once.

Molten resin is injected into resin injection hole 120 and spreads through runners 121 into each cavity 122 where it solidifies. Then the apparatus is cut apart at the gates between the runners 121 and cavities 122. A gasket can be obtained in this way.

According to this method, the solidified resin in the runners has to be discarded. Normally, as the amount of discarded resin is larger than that used for a gasket, disposal of such resin waste is undesirable.

The other method is called the hot runner method. According to this method, runners like the ones used for the cold runner method are not necessary. It is possible to inject molten resin directly into cavities.

Figure 7:
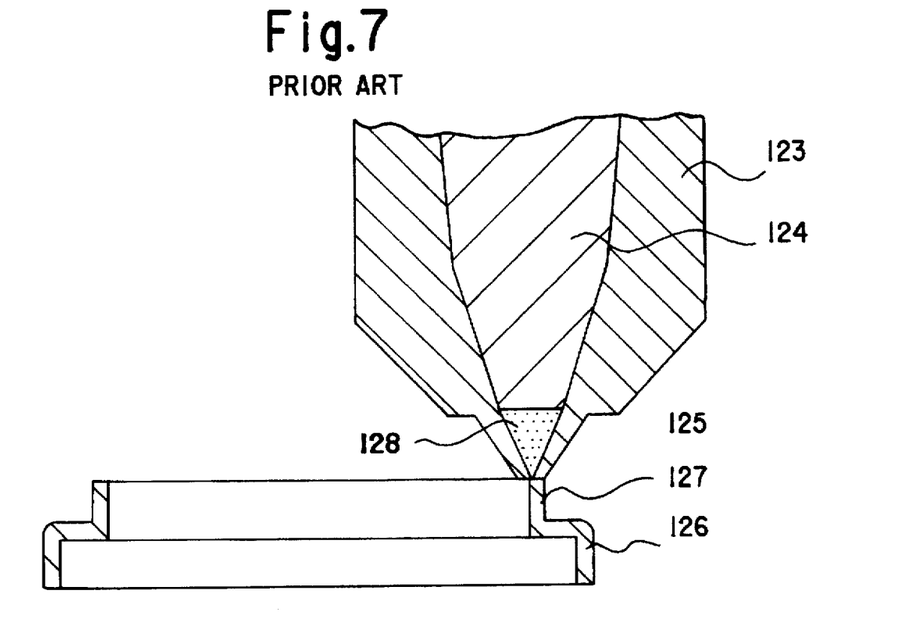
FIG. 7 is a cross-sectional view showing a conventional method for producing a gasket according to the hot runner method.

FIG. 7 shows an example. In order to keep the resin melted, a body heater 124 is placed in passage 123 through which molten resin runs. The molten resin is directly injected into the cavity 126 through a resin injection nozzle 125 which is a continuation of passage 123. In this case, the tip of resin injection nozzle 125 corresponds to gate 127 which is an entrance to cavity 126.

Tip heater 128 is placed in the resin injection nozzle 125. After the molten resin is injected into cavity 126, tip heater 128 is turned off. Then, the molten resin in resin injection nozzle 125 and cavity 126 solidifies. After that, the solidified resin is cut apart at gate 127, and a gasket removed from the metal mold. By turning tip heater 128 on again, the solidified resin in resin injection nozzle 125 melted. The molten resin is injected into cavity 126 for the next injection molding.

However, according to this method, the dimensions of the resin injection nozzle 125 becomes large. Therefore, even if it is possible to inject the molten resin from the top surface of the cavity, as shown in FIG. 7, it is difficult to inject it from a part of the internal surface of the cavity.

Figure 8:
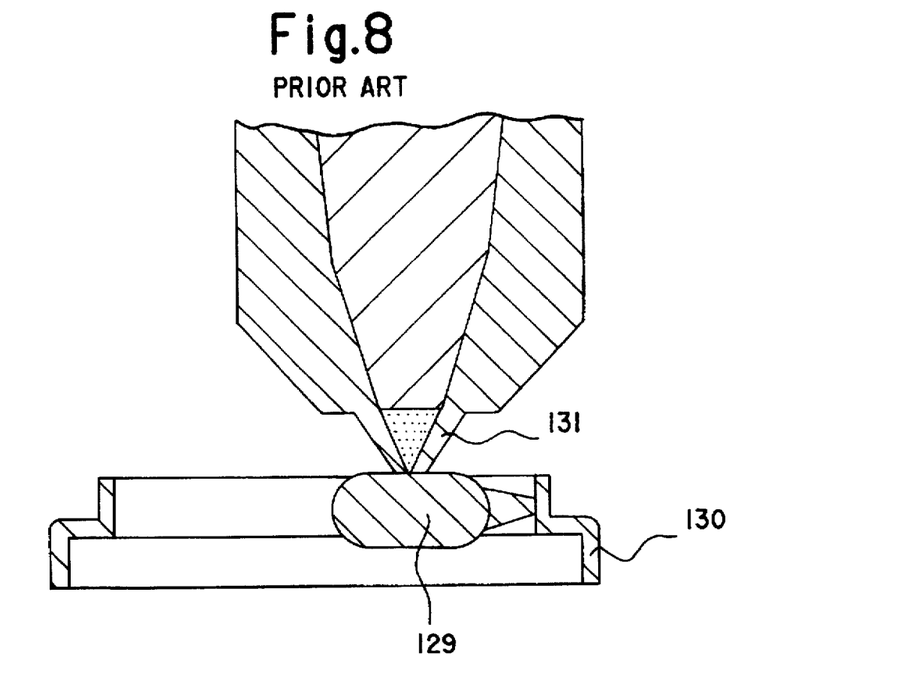
FIG. 8 is a cross-sectional view showing a conventional method for producing a gasket according to the hot runner method.
Figure 9:
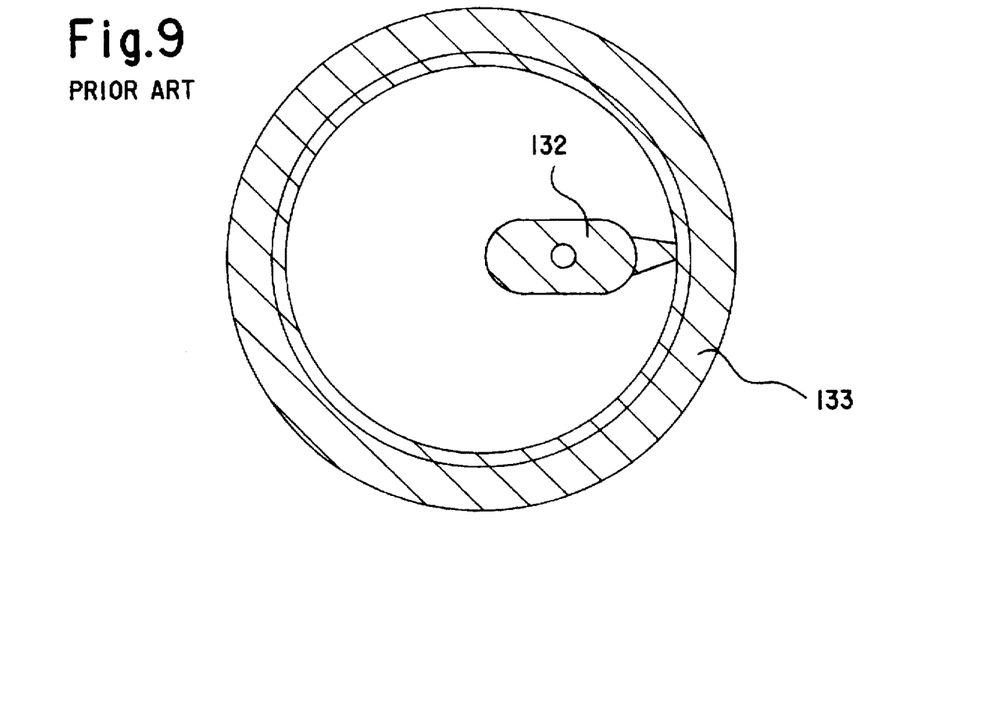
FIG. 9 is a plan view of a gasket produced by the method of FIG. 8.

Therefore, in order to overcome this difficulty, a second runner 129 should be used for the injection, as is shown in FIG. 8. Molten resin is injected into cavity 130. After the molten resin solidifies, it should be cut between second runner 129 and resin injection nozzle 131. Moreover, the solidified resin 132 in the second runner 129 in FIG. 9 must be cut apart from gasket 133 in the same figure, and it is necessary to dispose of the resin 132 in second runner 129.

SUMMARY OF THE INVENTION

It is an object of the present invention to improve the reliability of a battery cell by preventing the establishment of residual stresses in a sealing gasket body so as to provide a sealing gasket which does not crack.

The object can be achieved by the following features.

(1) A sealing gasket for a battery cell produced by injecting molten resin into a cavity from a gate which corresponds to a tip of a resin injection nozzle of a metal mold, comprising: a ring forming a body of the gasket; and an inward protrusion projecting inwardly from an internal surface of the ring, the gate being provided at a part which corresponds to the inward protrusion.

(2) A method of producing a sealing gasket comprising a ring forming a body of a gasket and an inward protrusion projecting inwardly from an internal surface of the ring, comprising steps of: loading a metal mold with molten resin by injecting the molten resin into a cavity having the same configuration as the gasket from a gate which corresponds to a tip of a resin injection nozzle of the metal mold and is provided at a part of the internal surface of the cavity, the part corresponding to the inward protrusion; and solidifying the injected molten resin.

In the sealing gasket produced above, residual stress is generated in the inward protrusion. Therefore, the strength of the gasket body does not deteriorate because the effects of the residual stress and cracking of the gasket body can be prevented.

According to the invention, it is preferable to set the size of the inward protrusion so as to be contained in a space inside the cell.

If molten resin is injected by means of the hot runner method, the construction of a resin injection nozzle including the gate becomes rather big as it must comprise a heater.

3

Therefore, it is difficult to provide the gate at the internal surface of the cavity, which corresponds to internal surface of the gasket body. However, according to the second feature, as the gate is provided at the part of the internal surface of the cavity, the part corresponding to the inward protrusion, it is possible to use the hot runner method.

This hot runner method has an advantage over the cold runner method, since it is possible to reduce the amount of waste resin generated from the production of a gasket.

BRIEF DESCRIPTION OF THE INVENTION

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS (Embodiment 1)

Figure 10:
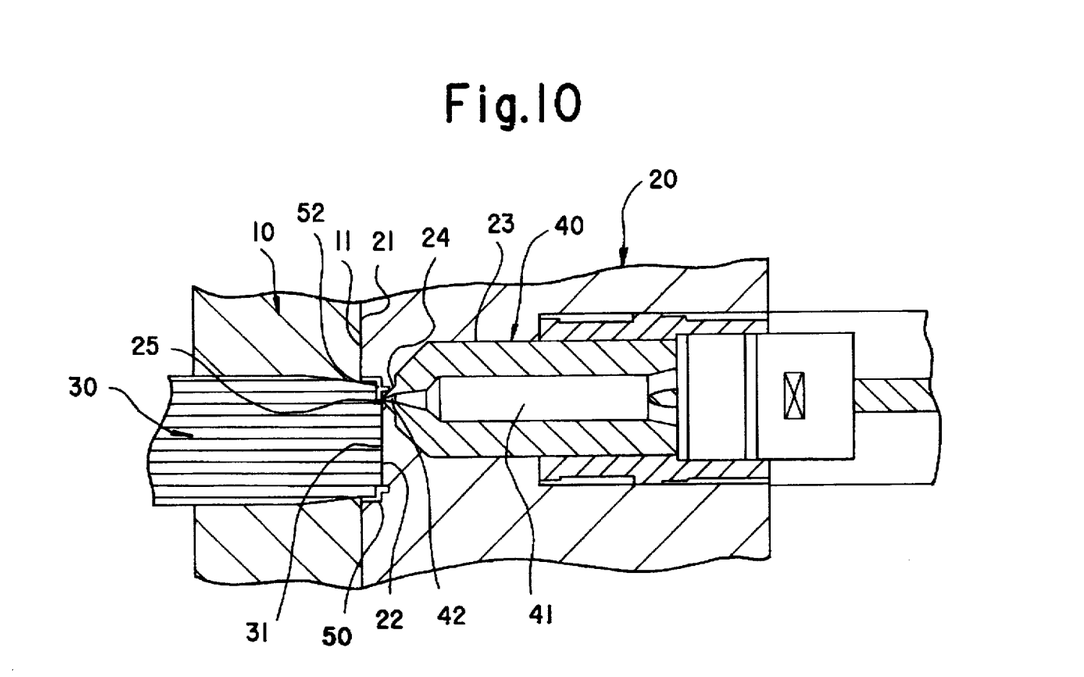
FIGS. 10 to 12 are cross-sectional views showing a gasket production device according to a first embodiment of the present invention.
Figure 11:
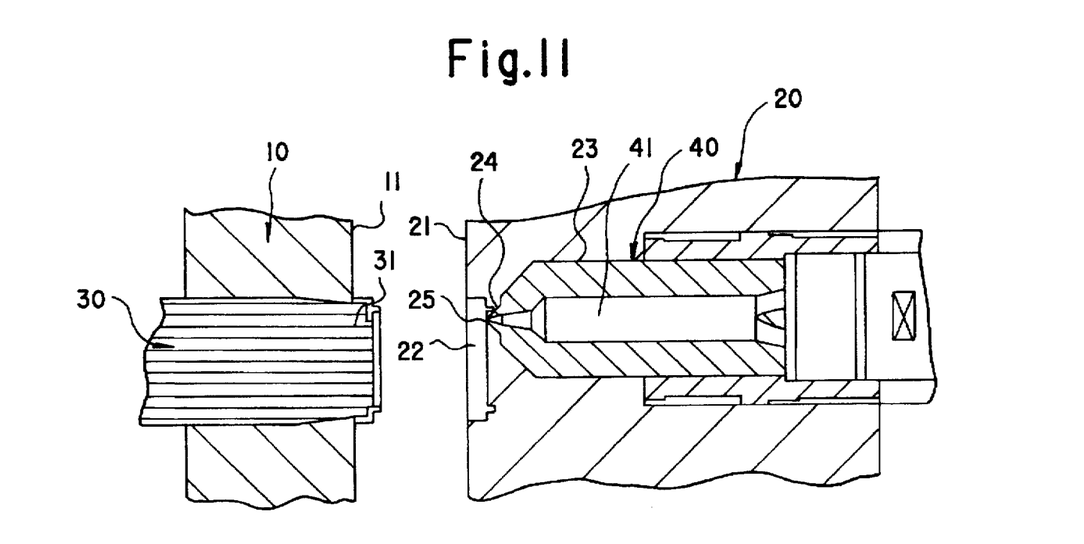
Figure 12:
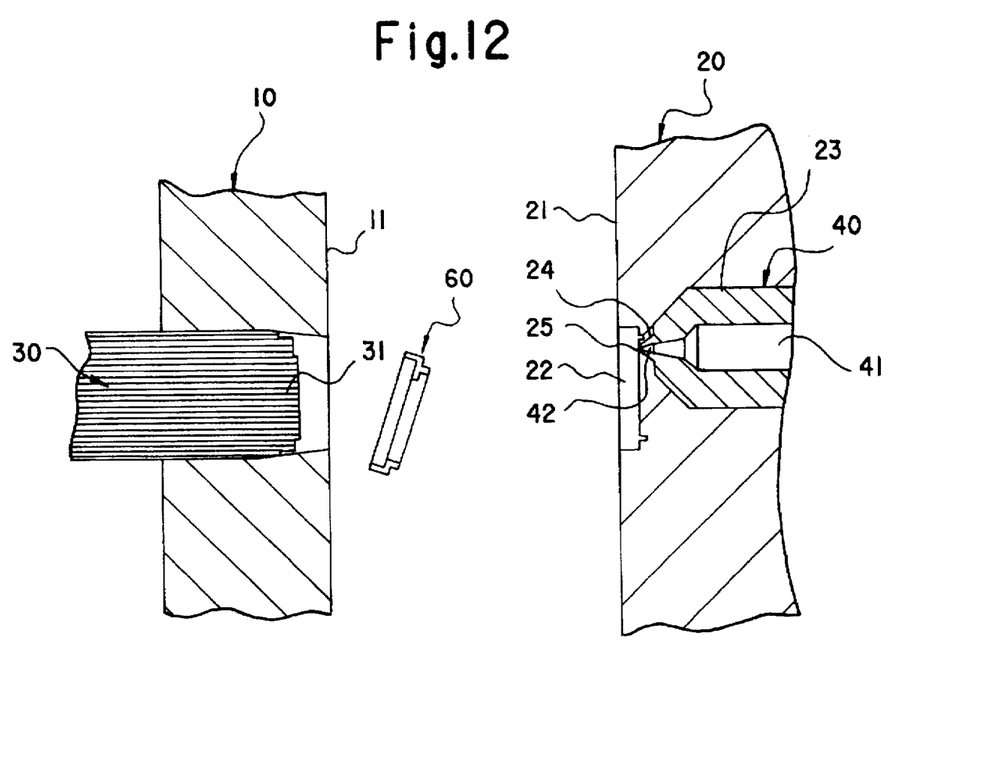
Figures 13, 14:
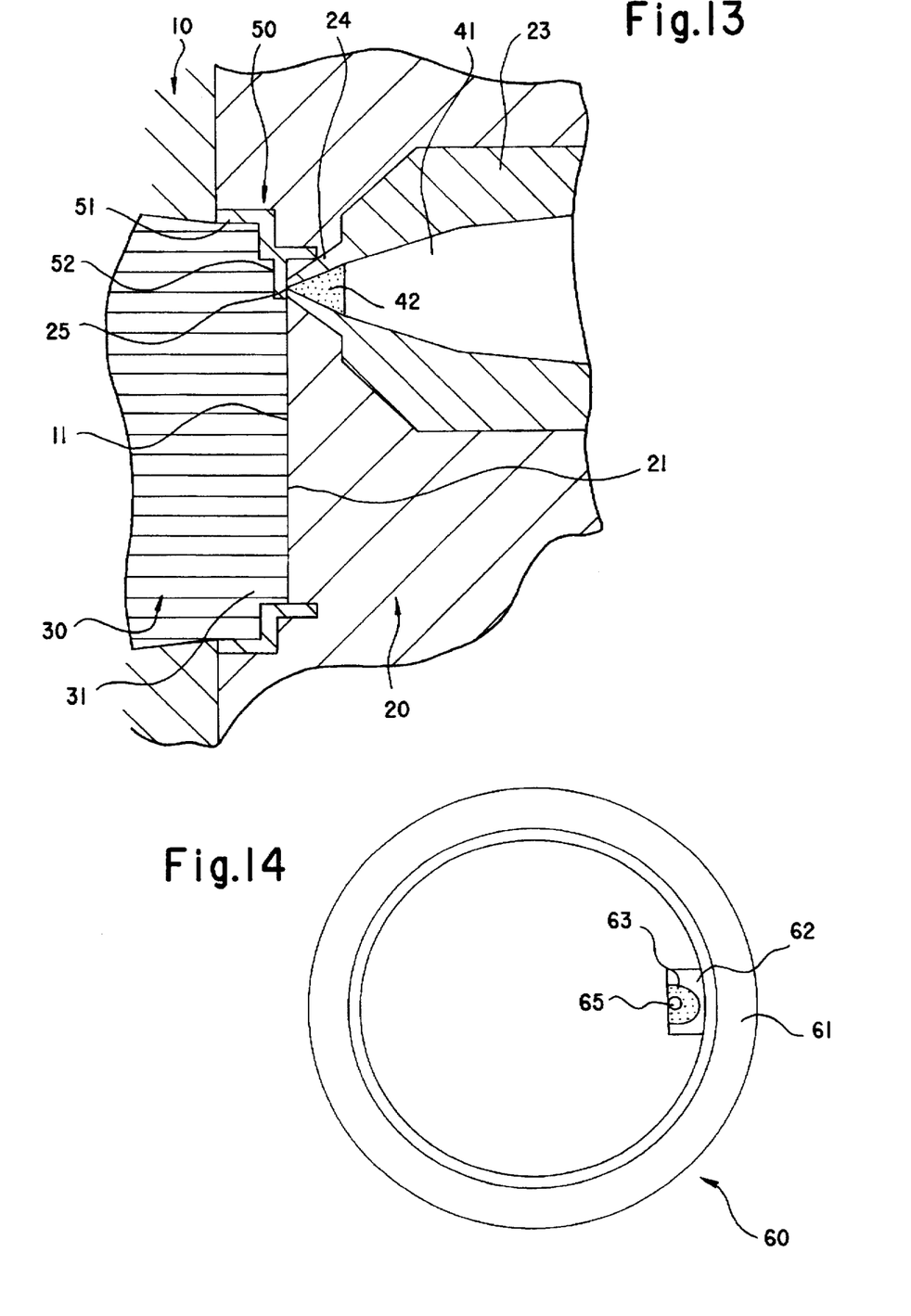
FIG. 13 an enlargement of FIG. 10.
FIG. 14 is a plan view of a gasket produced by the method of FIGS. 10 to 12.
Figure 15:
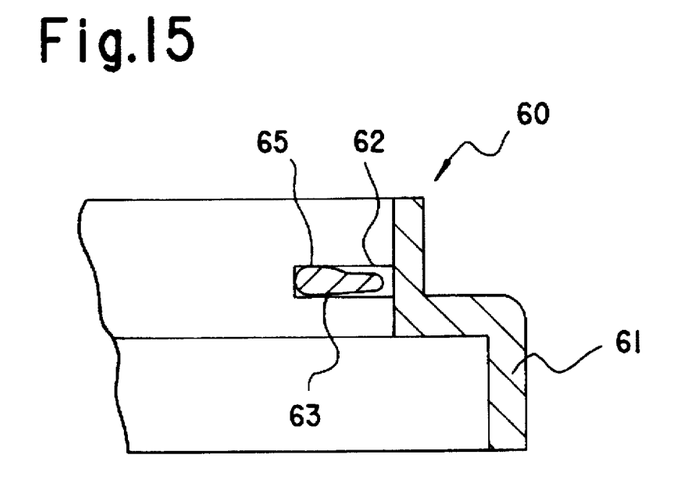
FIG. 15 is a cross-sectional view of a part of the gasket of FIG. 14.

FIGS. 10 to 12 are cross-sectional views of a gasket production device of the first embodiment of the present invention. FIG. 13 is an enlargement of FIG. 10. FIG. 14 is a plan view of a gasket produced from this device. FIG. 15 a part of the cross-sectional view of such a gasket.

As is apparent from FIG. 14, gasket 60 comprises ring 61 and inward protrusion 62 projecting inwardly from a part of the internal surface of ring 61. This gasket is produced by means of injection molding, with the hot runner method being used.

4

The kind of resin used here is resilient and melted by heat, such as nylon.

As is shown in FIGS. 10 to 12, the gasket production device comprises the following things: first metal mold 10, second metal mold 20 having a hollow space 22; cylindrical core insert block 30 placed in a position penetrating the first metal mold 10, so as to be received in hollow space 22; and the hot runner 40 provided in second metal mold 20.

A core insert block 30 is fixed to a core plate (not illustrated). First metal mold 10 and second metal mold 20 are supported by a supporter (not illustrated) so that the first metal mold 10 slides over the core insert block 30 and the second metal mold 20 slides to or away from the core insert block 30.

By sliding the first metal mold 10 to or away from the second metal mold 20, the face 11 of the first metal mold 10 and the face 21 of the second metal mold 20 can be in contact with each other (see FIG. 10) or separated (see FIGS. 11 and 12).

When faces 11 and 21 are in contact with each other, there is a space between the front part 31 of the core insert block 30, the hollow space 22, and face 11. This space defines a cavity 50 which has the same configuration as gasket 60.

By sliding metal mold 10 over the core insert block 30, the front part 31 of the core insert block 30 can be placed in a position where it extends beyond face 11 (see FIGS. 10 and 11) or a position where it is withdrawn from face 11 (see FIG. 12).

The configuration of the hot runner 40 can be explained as follows.

In the second metal mold 20, in order to heat resin, a body heater 41 is placed in the center of a cylindrical passage 23 through which injected molten resin runs.

A conically tapered resin injection nozzle 24 is formed as a continuation of the passage 23. The tip of the resin injection nozzle 24, that is, gate 25, is aligned with a part of hollow space 22 so that the molten resin runs out of gate 25. The part of hollow space 22 will become a part of an inward protrusion portion 52 of cavity 50.

In the center of the tapered resin injection nozzle 24, a tip heater 42 is placed so as to heat the resin in the resin injection nozzle 24.

Hot runner 40 must be big enough to comprise include body heater 41 and tip heater 42. Therefore, it is difficult to inject the molten resin directly into a gate provided on the internal surface of ring portion 51 of the cavity 50, but it is easy to inject the molten resin into the gate 25 provided on the inward protrusion 52.

Gasket 60 can be produced by injection molding with this gasket production device in the following way.

FIG. 10 shows how molten resin is injected from hot runner 40. First, body heater 41 and tip heater 42 are turned on. Then the resin in passage 23 and the resin injection nozzle 24 can be kept melted and injected into the cavity through gate 25. The resin runs through the inward protrusion 52 and spreads into the ring portion 51 of the cavity 50 (see FIG. 13).

After cavity 50 is loaded with the molten resin, tip heater 42 is turned off. Then, the molten resin in the cavity 50 and the resin injection nozzle 24 solidifies. At this stage, the solidified gasket 60 in cavity 50 is connected to solidified resin in the resin injection nozzle 24 at gate 25.

Although it is not shown in the drawing figures, gasket 60 lightly engages the front part 31 of the core insert block 30.

FIG. 11 shows the second metal mold 20 withdrawn from the gasket 60.

After the solidification of the molten resin, the first metal mold 10 is withdrawn from the second metal mold 20 by sliding. Then the gasket 60 is removed from the hollow space 22 as a result of the gasket 60 being engaged with the front part 31 of the core block, and the solidified resin is cut at gate 25.

During the solidification and cutting mentioned above, the body heater 41 is turned on so as to keep the resin in passage 23 melted.

FIG. 12 shows gasket 60 removed away from the front part 31 of the core insert block 30.

By sliding the first metal mold 10, the front edge 31 of the core insert block 30 can be placed in a position where it is withdrawn from the face 11. As a result, the gasket 60 is discharged from the core block front part 31.

For the next injection molding, the tip heater 42 is turned on in a state as shown in FIG. 10 so as to melt the resin in the resin injection nozzle 24. Then, the molten resin is injected as described above.

FIGS. 14 and 15 are examples of polarization pictures of a gasket 60 produced in the above mentioned way. As is apparent from these figures, the residual stress part 63 is generated in the inward protrusion 62 but not in the ring 61. That is, a part having weak mechanical strength, which causes cracking, is not generated in the ring 61. Reference number 65 represents the position of gate 25.

(Embodiment 2)

Figure 16:
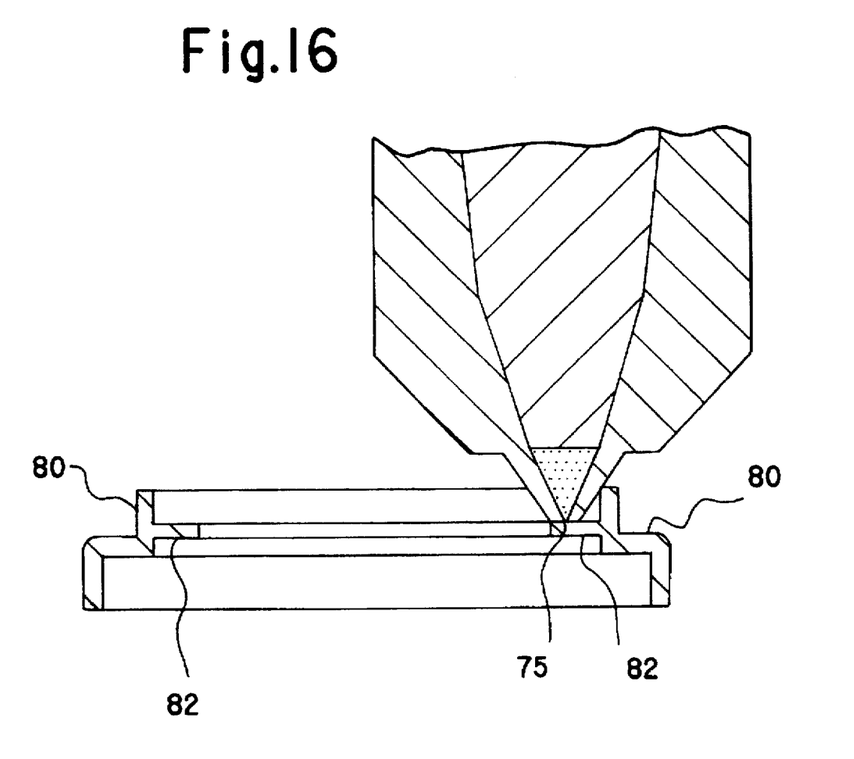
FIG. 16 is a cross-sectional view showing a method for producing a gasket according to a second embodiment of the present invention.
Figure 17:
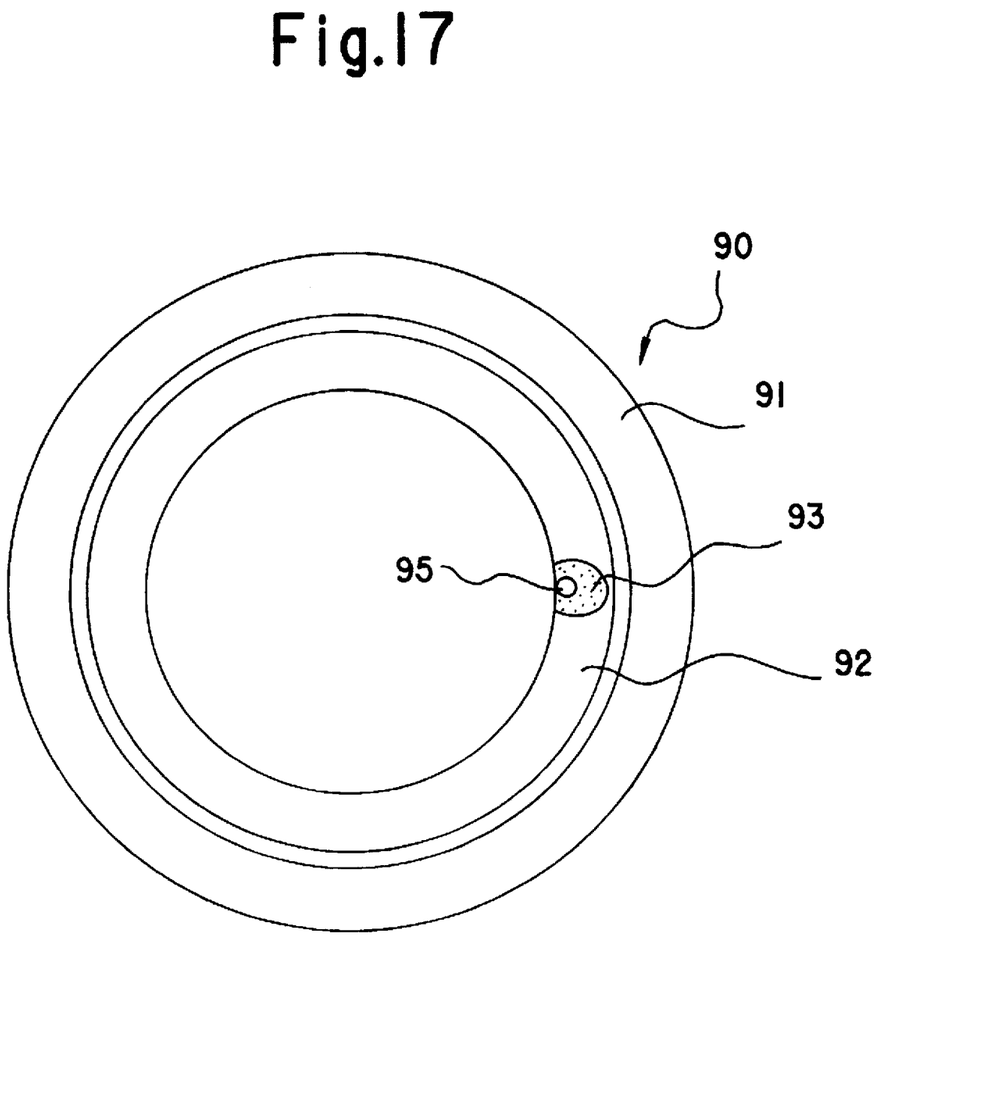
FIG. 17 is a plan view of a gasket produced by the method of FIG. 16.

FIG. 16 is a cross-sectional view showing a method for producing a gasket of the second embodiment of the present invention. FIG. 17 is a plan view of the gasket produced in this method.

As is apparent from FIG. 17, the gasket comprises ring 90 and ring inward protrusion 92 which extends about the internal circumference of ring 91 and protrudes inwardly from its internal surface.

Gate 75 is provided at a part of the metal mold, which corresponds to a part of the inward protrusion 82 of cavity 80. This gasket is also produced by means of injection molding, with the hot runner method being used.

As is shown in FIG. 17, the residual stress part 93 is generated in the inward protrusion 92 but not in the ring 91. Reference number 95 represents the position of gate 75.

Figure 18:
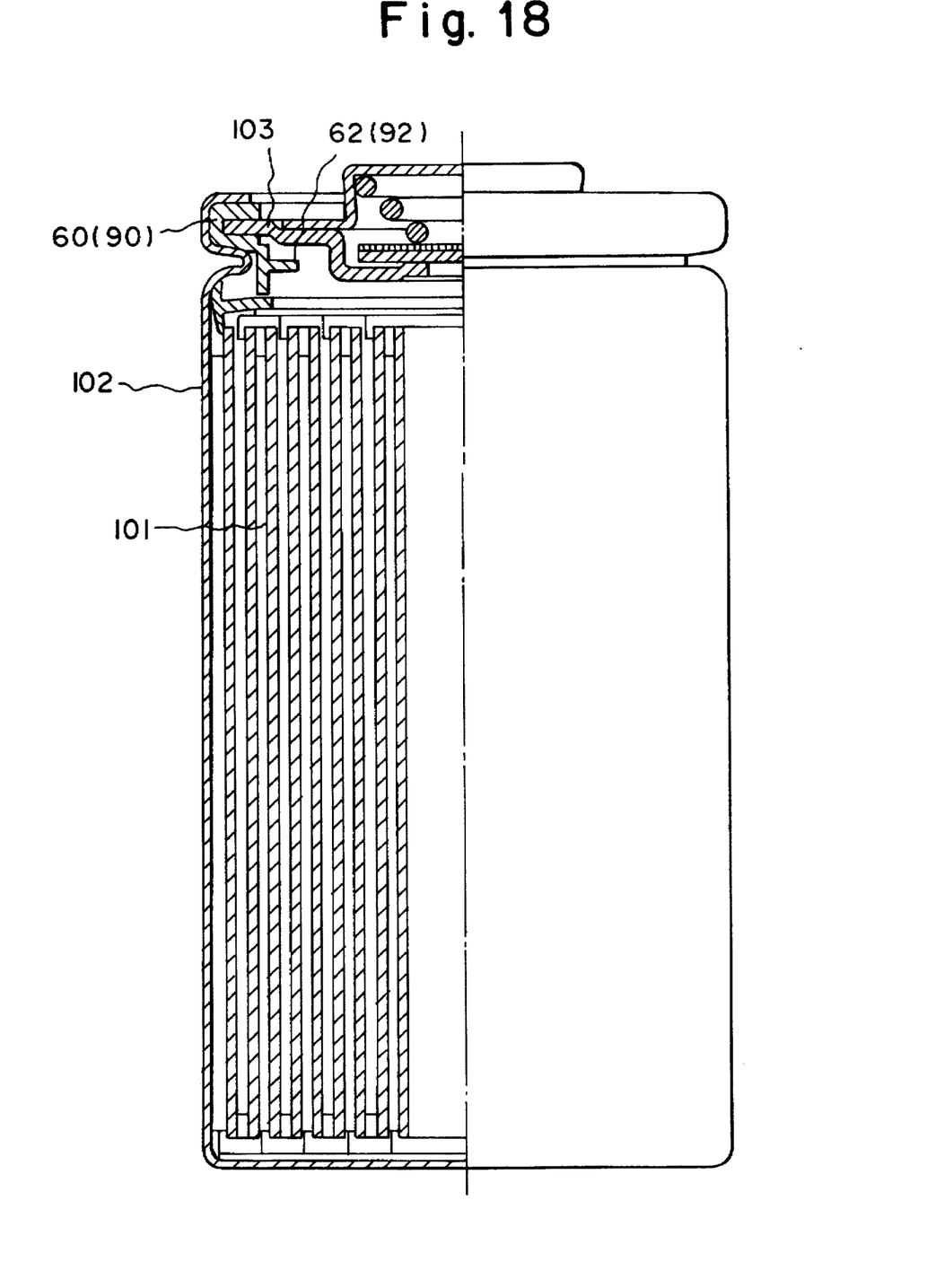
FIG. 18 is a cross-sectional view showing a gasket of the first embodiment or the second embodiment installed in a battery cell.

FIG. 18 shows the gasket 60(90) having an inward protrusion 62(92), which gasket is either of the first embodiment or the second embodiment, installed in a cell.

In this figure, electrode assembly 101, consisting of a positive electrode and a negative electrode insulated by a separator, is placed in metal casing 102. A metal cover plate 103 is fixed to the opening of the metal casing 102 by means of gasket 60(90) so that the opening of metal casing 102 can be sealed hermetically.

As shown in FIG. 18, as the inward protrusion 62(92) is disposed in a space between the electrode assembly 101 and the electrode cover plate 103 when the gasket 60(90) is installed in a cell, the functions of the gasket 60(90) and electrode assembly 101 are not destroyed.

The shape of the inward protrusion of the gasket can be determined according to the inside space of a cell to be used.

Although the present invention has been fully described by means of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A battery cell, comprising:

an electrode assembly including in concentrically disposed relation a positive electrode, a negative electrode, and an insulator separating said positive and negative electrodes, a metal casing, open at one end, concentrically enclosing said electrode assembly, an electrode cover plate disposed in said open end of said metal casing in axially spaced relation with respect to said electrode assembly to define a space therebetween, a gasket disposed between said electrode cover plate and said electrode assembly for hermetically sealing said battery cell, said gasket being formed of moldable resin material and having a ring portion concentrically lining said metal casing in the space between said electrode assembly and said electrode cover plate, and a protrusion portion sized to contain the concentration of residual molding stresses and fit within said space, said protrusion extending radially inwardly from said ring portion and disposed in said space between said electrode assembly and said electrode cover plate.

2. The battery cell according to claim 1 wherein said protrusion portion of said gasket is disposed in said space in spaced relation with respect to said electrode assembly and said electrode cover plate.

3. The battery cell according to claim 1 in which said protrusion portion of said gasket comprises a tab extending radially from an interior wall of said ring portion.

4. The battery cell according to claim 1 in which said protrusion portion of said gasket extends radially from an interior wall of said ring portion about the entire circumference thereof.

5. A method of producing a sealing gasket for a battery cell including a cylindrical ring forming a body of said gasket and a protrusion, said protrusion being sized to contain concentrations of residual molding stresses and fit within a space between a metal casing and a concentric electrode assembly of said battery cell, said protrusion projecting radially from an internal surface of said ring, comprising the steps of:

providing a first metal mold and a second metal mold containing facing surfaces cooperating to define a mold cavity defining said gasket ring and protrusion portions of said gasket, providing a molding apparatus in one of said metal molds with a nozzle having a gate therein communicating with said protrusion-forming portion of said mold cavity, injecting molten resin by said molding apparatus into said protrusion forming portion of said mold cavity to form said protrusion, and solidifying said injected molten resin.

6. A method of producing a sealing gasket of claim 5 which said molten injection step is conducted by a hot runner molding apparatus.

7. The method of producing a sealing gasket of claim 5 including the further step of cutting the solidified resin at the gate.

8. The method of producing a sealing gasket of claim 7, including the step of heating the resin in said resin injection nozzle.

* * * * *